(12) United States Patent
Ariav

(10) Patent No.: US 6,329,774 B1
(45) Date of Patent: Dec. 11, 2001

(54) ULTRASONIC METHOD AND APPARATUS FOR AUTOMATICALLY CONTROLLING MOVING DOORS

(75) Inventor: Arie Ariav, Doar Na Hof Ashkelon (IL)

(73) Assignee: Janus Development Ltd., Ashkelon (IL)

( * ) Notice: Subject to any disclaimer, the term of this patent is extended or adjusted under 35 U.S.C. 154(b) by 0 days.

(21) Appl. No.: 09/531,410

(22) Filed: Mar. 20, 2000

Related U.S. Application Data

(63) Continuation-in-part of application No. 09/245,742, filed on Feb. 8, 1999, now Pat. No. 6,255,791.
(60) Provisional application No. 60/125,976, filed on Mar. 24, 1999.

(30) Foreign Application Priority Data

Feb. 8, 1998 (IL) ........................................................ 123216

(51) Int. Cl.⁷ ...................................................... H02P 7/00
(52) U.S. Cl. .......................... 318/282; 318/468; 318/480; 49/25
(58) Field of Search .................................... 378/282, 468, 378/480, 445, 446, 466; 49/25

(56) References Cited

U.S. PATENT DOCUMENTS

| Re. 37,260 | * 7/2001 | Varga et al. | 318/284 |
|---|---|---|---|
| 4,506,765 | * 3/1985 | Payne et al. | 318/467 |
| 4,706,227 | 11/1987 | Du Vall et al. . | |
| 4,894,952 | 1/1990 | Trett et al. . | |
| 4,914,859 | 4/1990 | Gionet et al. . | |
| 5,097,454 | * 3/1992 | Schwarz et al. | 318/466 |

* cited by examiner

Primary Examiner—Karen Masih

(57) ABSTRACT

A method and apparatus for automatically controlling the movement of a door over a floor from an open position to a closed position with respect to a door frame, by mounting ultrasonic transmitters at one side of the door frame and oriented to transmit ultrasonic energy downwardly towards the floor and to reflect the energy from the floor upwardly upwardly at the other side of the door frame; mounting ultrasonic receivers over the door frame at the opposite side and oriented to receive the energy from the ultrasonic transmitter reflected by the floor; and processing the reflected energy received by the ultrasonic receiver to detect the presence of an object in the path of the door, when moving toward its closed position, and to automatically interrupt the closing of the door.

20 Claims, 6 Drawing Sheets

ULTRASONIC METHOD AND APPARATUS FOR AUTOMATICALLY CONTROLLING MOVING DOORS

RELATED APPLICATIONS

The present application is a Continuation-In-Part of U.S. application Ser. No. 09/245,742, filed Feb. 8, 1999, now U.S. Pat. No. 6,255,791 and is based on Provisional Application 60/125,976 filed Mar. 24, 1999.

FIELD AND BACKGROUND OF THE INVENTION

The present invention relates to an ultrasonic method and apparatus for automatically controlling the opening and closing of moving doors, particularly sliding doors.

Automatic door control systems are gaining wide-spread use in order to control traffic into or out of enclosed spaces which are heated or cooled by airconditioning systems. Such door control systems not only must detect and respond to objects moving towards the closed doors, but must also provide protection against injury by a closing or opening door, and further, should minimize the time the door is in the open condition in order to minimize wastage of the energy used for airconditioning the enclosed space.

My above-cited patent application describes a method and apparatus for automatically controlling the opening and closing of a door movable over a floor, and a drive for driving the door to its open and closed positions, by: (a) ultrasonically monitoring a predetermined approach area located in front of the door for the entry of an object into the approach area and the movement of the object towards the closed door; (b) ultrasonically monitoring a predetermined opening-door protect area laterally outwardly of the outer end of the closed door, and a predetermined closing-door protect area inwards of the inner end of the door for the presence of an object in the opening-door and closing-door protect areas; and (c) controlling the drive in response to the monitoring operations.

According to the preferred embodiment described therein, a predetermined approach area located in front of the door is ultrasonically monitored by: (i) dividing the predetermined approach area into a plurality of strips; (ii) dividing each strip into a plurality of cells, to thereby define a matrix of cells; (iii) detecting the presence of an object in any of the matrix of cells; (iv) detecting the center of gravity of all the cells in which an object is detected; (v) monitoring the movement of the detected center of gravity with respect to the door; and (vi) controlling the drive to open the door when the detected center of gravity is determined to be moving towards, and at a predetermined speed towards or within a predetermined distance from, the closed door.

As further described in the above-cited patent application, such a method may be implemented by an expansible modular construction by providing an ultrasonic head for each strip of the approach area and by processing the output of each head in a separate channel. Also, the novel method avoids the need to discriminate between different sensors (e.g., by frequency or time discrimination), and also the need to distinguish between many objects in the approach area. Such a method also distinguishes cross-traffic (traffic moving substantially parallel to the doors) which should not open the doors, from approaching traffic which should open the doors.

The present application relates primarily to controlling the closing of the door in order to produce a relatively fast closing, with a reduced danger of causing injury to a person having a body part in the path of the closing door.

At the present time, closing of doors is generally controlled by optical systems, such as those used with respect to elevator doors. However, optical systems generally require wiring within the door, which is expensive to install and to maintain. Further, the detection is effective with respect to limited confined areas through which the optical beam or beams are transmitted, and therefore may not detect an object which may be above, below, or to one side, of the optical beam. Further, such systems may sometimes be "blinded" by sun light.

OBJECT AND BRIEF SUMMARY OF THE PRESENT INVENTION

An object of the present invention is to provide a method and system for controlling moving doors, particularly the closing movement of the doors, which method and apparatus have advantages in the above respects.

According to one aspect of the present invention, there is provided a method of automatically controlling movement of a door over a floor from an open position to a closed position with respect to a door frame, comprising: mounting at least one ultrasonic transmitter over the door frame at one side thereof and oriented to transmit ultrasonic energy downwardly towards the floor and to reflect the energy from the floor upwardly at the opposite side of the door frame; mounting at least one ultrasonic receiver over the door frame at the opposite side thereof and oriented to receive the energy from the ultrasonic transmitter reflected by the floor; and processing the reflected energy received by the ultrasonic receiver to detect the presence of an object in the path of the door, when moving toward its closed position, and to automatically interrupt the closing of the door in response to such detection.

According to further features in the described preferred embodiment, the intensity of the energy received by the ultrasonic receiver, and the time of receipt thereof relative to the time such energy was transmitted by the ultrasonic transmitter, are utilized for detecting the location of an object with respect to the path of the closing door. The intensity of the energy received by the ultrasonic receiver is also used for determining the position of the door with respect to the door frame.

According to still further features in the described preferred embodiment, the determined door position controls the closing of the door by applying, during the initial and final closing movements of the door, a high sensitivity to the detection of an object in the path of the closing door, and during the intermediate closing movement of the door, a low sensitivity to the detection of such an object.

The invention also provides apparatus for automatically controlling the closing of doors in accordance with the above method.

The invention is particularly useful with respect to sliding doors, especially in the method and apparatus described in the above-cited patent application, and the invention is therefore described below with respect to such an application.

BRIEF DESCRIPTION OF THE DRAWINGS

The invention is herein described, by way of example only, with reference to the accompanying drawings, wherein.

DESCRIPTION OF A PREFERRED EMBODIMENT

As indicated above, the invention is described below with respect to the method and apparatus illustrated in my patent application U.S. Ser. No. 09/245,742, filed Feb. 8, 1999.

Figure 1:
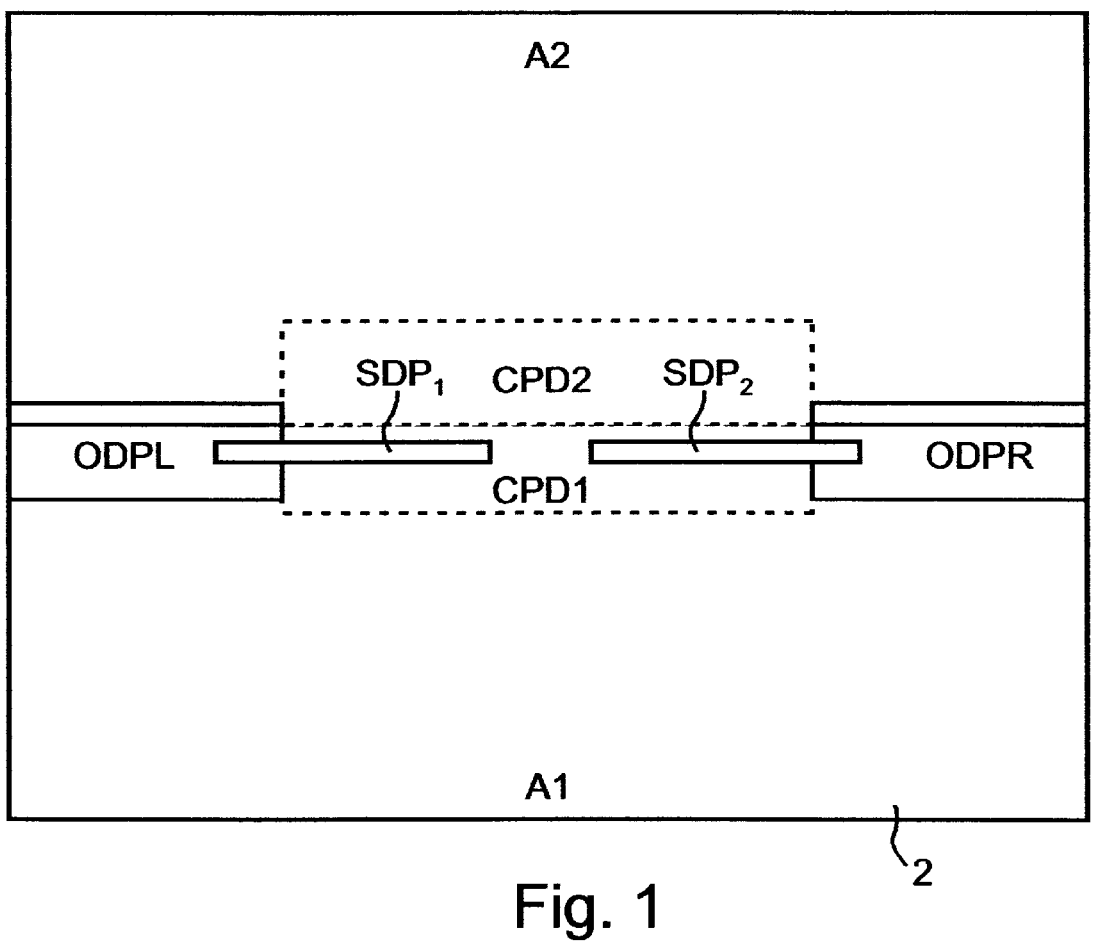
FIG. 1 is a typical door area diagram which will be helpfull in explaining the present invention.

FIG. 1 diagramatically illustrates, in top plan view, a sliding door in the form of a pair of sliding door panels $SDP_1$, $SDP_2$ movable to their closed positions and to their open positions over a floor 2 to control the flow of traffic through a passageway defined by the door panels. The area on each side of the two sliding door panels $SDP_1$, $SDP_2$, is divided into the following: a predetermined approach area A1, A2 located in front of the sliding door panels on each side thereof; an opening-door protect area ODPL (left), ODPR (right), laterally outwardly of the outer ends of the sliding door panels when in their closed positions; and a closing-door protect area CDP1, CDP2, between the inner ends of the sliding door panels when in their open positions.

As described in my above-cited application, the approach areas A1, A2 are continuously monitored for the entry of an object therein, and for the movement of the object towards the closed sliding door panels, to open them at the proper time. The opening-door protect areas ODPL, ODPR are continuously monitored such that the presence of an object in those areas when the doors are to open will produce a slow opening of the doors; and the closing-door protect areas CDP1, CDP2 are also continuously monitored such that the presence of an object in those areas when the doors are to close will automatically interrupt the closing of the doors and reopen them.

Figure 2:
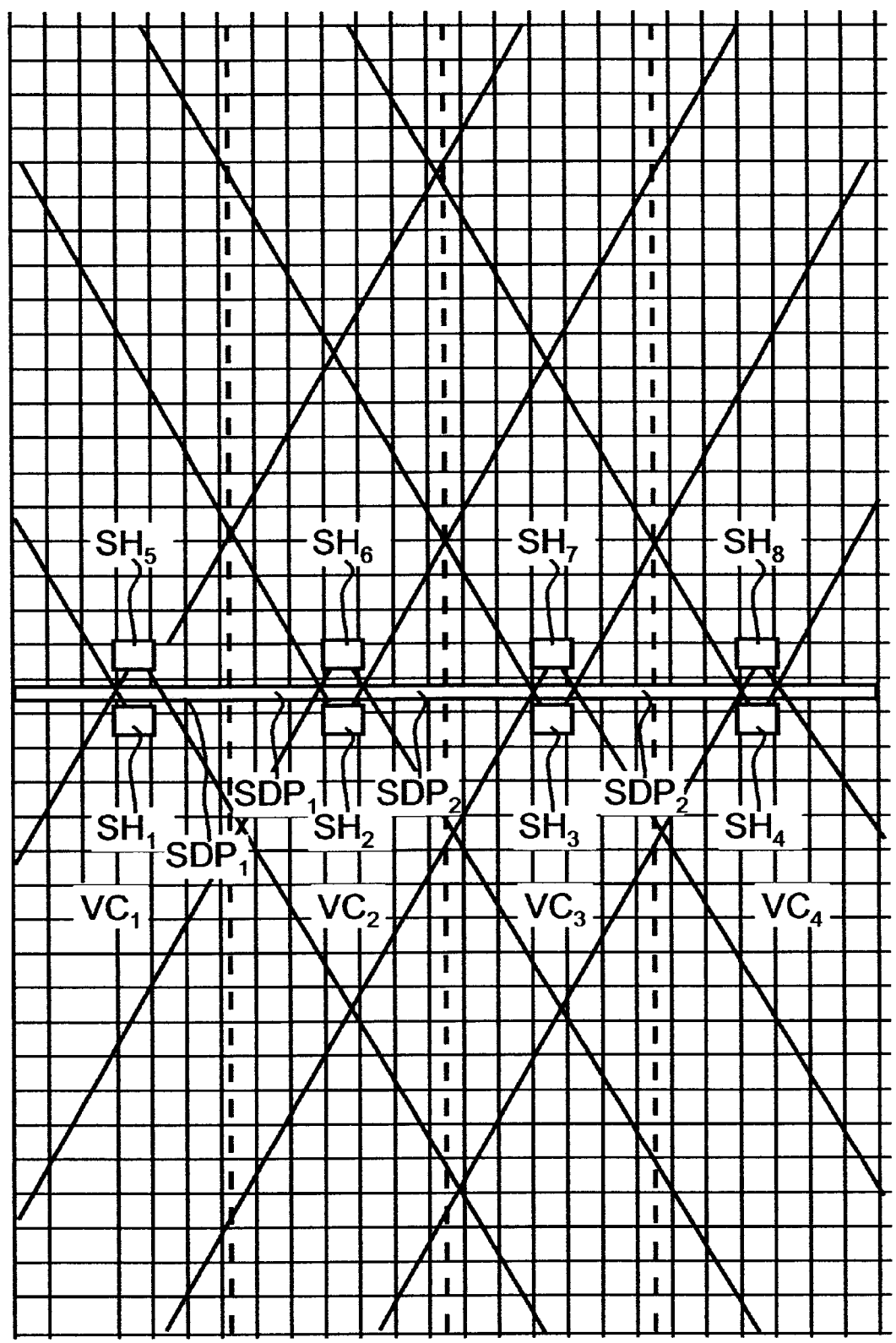
FIG. 2 is a top plan view diagramatically illustrating one implementation of the present invention utilizing four sensor heads on each side of the door to be controlled.

The monitoring of the areas illustrated in FIG. 1 is effected by apparatus of a modular construction which, in the illustrated example, includes eight sensor heads $SH_1$–$SH_8$ carried on opposite sides of the door frame spaced along the sliding door panels $SDP_1$, $SDP_2$. Thus, as shown in FIG. 2, four sensor heads $SH_1$–$SH_4$ are located over the sliding door panels to face one side of the passageway defined by the door frame, and the remaining sensor heads $SH_5$–$SH_8$ are spaced over the sliding door panels facing the opposite side of the passageway. The two end sensor heads $SH_1$, $SH_5$ are located centrally of the sliding door panel $SDP_1$ in its open position; sensor heads $SH_2$, $SH_6$ are located centrally of the sliding door panel $SDP_1$ in its closed position; sensor heads $SH_3$, $SH_7$ are located centrally of the sliding door panel $SDP_2$ in its closed position; and sensor heads $SH_4$, $SH_8$ are located centrally of sliding door panel $SDP_2$ in its open position.

As described more particularly below with respect to FIGS. 3 and 4, each sensor head $SH_1$–$SH_8$ includes three sensors, each in the form of an ultrasonic transceiver. One sensor in each head is used for monitoring the approach area A1, A2 (FIG. 1); and the other two sensors in each head are used for monitoring the opening-door protect areas ODPL, ODPR and the closing-door protect areas CDP1, CDP2.

As further shown in FIG. 2, each of the approach areas A1, A2 on the opposite sides of the sliding door panels $SDP_1$, $SDP_2$, is divided into a plurality of strips, one for each head, with each strip divided into a plurality of cells to define a matrix of cells. In this case, the cells are arranged in four vertical strips or columns $VC_1$–$VC_4$, each defined by one head located at either the open position or the closed position of one of the two sliding door panels $SDP_1$, $SDP_2$. Each matrix further includes a plurality of horizontal rows, in this case 20 horizontal rows, $HR_1$–$HR_{20}$. As one example, the approach area A1, A2 on each side of the sliding door panels may be 340 cm, in which case the height of each row would be 17 cm.

Figure 3:
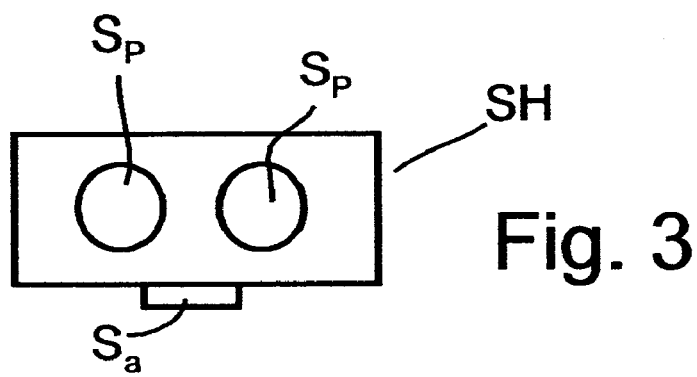
FIG. 3 is a bottom plan view of one of the eight sensor heads in the implementation of FIG. 2.
Figure 4:
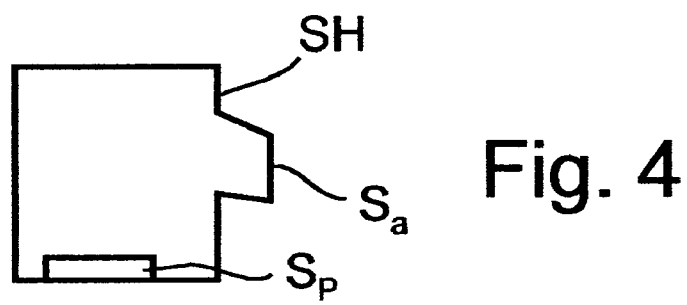
FIG. 4 is a side elevational view of the sensor head of FIG. 3.
Figure 5:
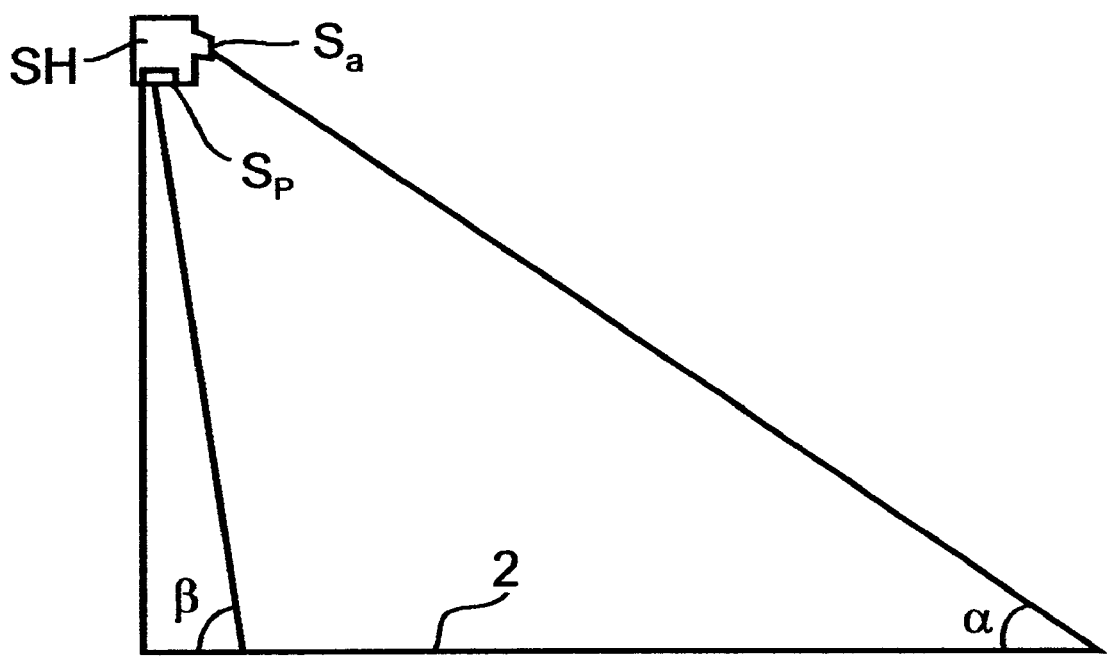
FIG. 5 is a side view diagramatically illustrating the angular deployment of the sensor heads in the implementation of FIG. 2.

FIGS. 3 and 4 diagrammatically illustrate the construction of each of the sensor heads $SH_1$–$SH_8$; and FIG. 5 diagramatically illustrates the angular deployment of the sensor heads with respect to the floor 2 in the area being monitored.

Thus, as shown in FIGS. 3 and 4, each sensor head, therein designated SH, includes one approach sensor Sa and two protect sensors Sp. As shown in FIG. 5, the approach sensor Sa is a wide-angle ultrasonic transceiver outputting a wide conical beam (e.g., 60°) and is oriented with respect to the floor such that its outer ray is at an acute angle α (e.g., about 30°) with respect to the floor 2 to thereby cover the complete approach area (A1, A2, FIG. 1). Each protect sensor Sp is a similar ultrasonic transceiver outputting a conical beam but substantially perpendicularly to the floor 2 adjacent to the sliding door panels $SDP_1$, $SDP_2$. In the example illustrated in FIG. 5, the protect sensors Sp output a 60° ultrasonic beam, with its central axis perpendicular to the floor, but only one-half the beam is utilized on each side of the sliding door panels, so that the angle β of its outer ray with respect to the floor 2 is approximately 60°.

It will be appreciated that the protect sensors $S_p$ in the end sensor heads ($SH_1$, $SH_5$, $SH_4$, $SH_8$) monitor the opening-door protect areas ODPL, ODPR (FIG. 1); and that the protect sensors $S_p$ in the remaining middle sensor heads monitor the closing-door protect areas $CDP_1$, $CDP_2$. On the other hand, all the approach sensors Sa on one side of the sliding door panels monitor the complete approach area, A1 or A2, on the respective side.

Figure 6:
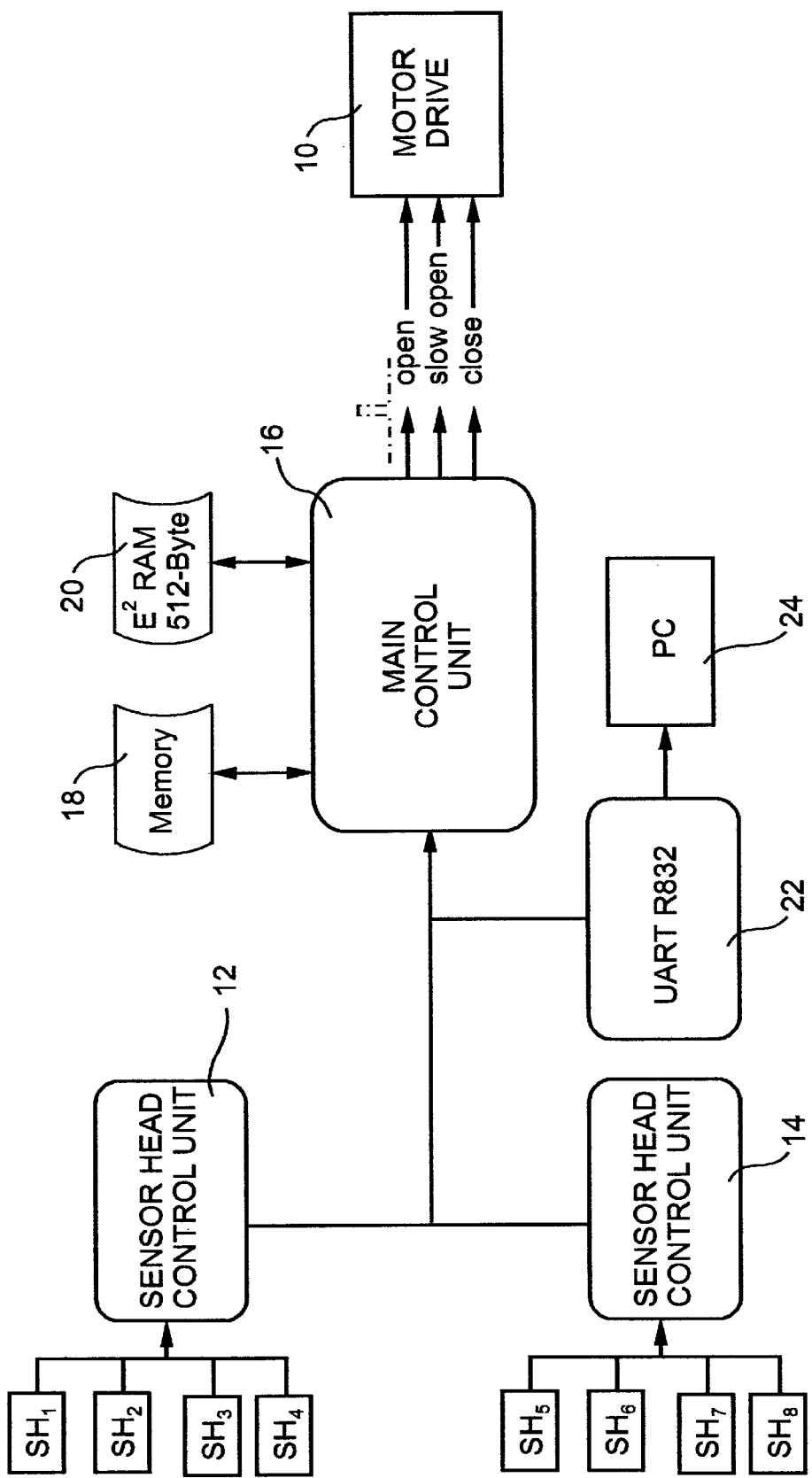
FIG. 6 is a block diagram illustrating one form of overall apparatus constructed in accordance with the present invention.

FIG. 6 illustrates the overall control system for controlling the motor drive 10 in response to the objects detected by the sensor heads $SH_1$–$SH_4$ on one side of the sliding door panels, and the sensor heads $SH_5$–$SH_8$ on the opposite side of the sliding door panels. The control system illustrated in FIG. 6 includes a sensor head control unit 12 connected to the first group of sensor heads $SH_1$–$SH_4$, and a second sensor head control unit 14 connected to the second group of sensor heads $SH_5$–$SH_8$. The two sensor head control units 12, 14, feed a main control unit 16 which controls the motor drive 10 for driving the sliding door panels $SDP_1$, $SDP_2$ to their open and closed positions.

The control system illustrated in FIG. 6 further includes an external memory 18 for storing the data being processed in the main control unit 16; a 512-byte $E^2$ RAM 20 for storing data in a non-volatile manner; and an UART RS232 (Universal Asynchronous Receiver Transmitter) for interfacing the control system with an external computer 24 for remote monitoring via an RS-232 interface.

As one example, each of the sensor head control units 12, 14, may be microcontroller PIC16c73 by Microchip; and the main control unit 16 may be microcontroller PIC17cxx by Microchip.

As described earlier, the illustrated system is of a modular construction including the appropriate number of sensor heads SH, and processing circuitry therefor, corresponding to the size of the door passageway to be monitored. In the example illustrated, there are four sensor heads on each side of the passageway. Each of the eight sensor heads $SH_1$–$SH_8$ includes an ultrasonic transceiver for monitoring the approoch area ($A_1$, $A_2$, FIG. 1) and two ultrasonic transceivers for monitoring the two protect areas, namely the opening-door protect areas ODPL, ODPR, laterally of the sliding door panels $SDP_1$, $SDP_2$, and the closing-door protect areas $CDP_1$, $CDP_2$ between the two sliding door panels.

Each such transceiver includes a transmitter, a receiver, an amplifier and an analog-to-digital converter for detecting objects within the respective area, by their echoes, and for outputting measurement data representing the locations of the respective objects. These transceivers, for example, may be piezoelectrical devices operating at an ultrasonic frequency of 40 kHz.

The above-cited patent application describes the operation of each of the two sensor head control units 12, 14, serving the two groups of sensor heads $SH_1$–$SH_4$ and $SH_5$–$SH_8$ on opposite sides of the sliding door panels $SDP_1$, $SDP_2$. As described, each transceiver transmits a pulse, receives its echo, and converts the energy level of the received echo to digital form. The processor then processes the digital form of the received energy according to the operations described therein. These operations are performed sequentially with respect to the data received by each of the four approach sensors Sa and then by the four protect sensors Sp. At the end of the sampling time, all the data accumulated in their respective buffers is sent to the main control unit 16.

Initially, the system operates according to a Study Mode, in which, the main control unit 16 initializes the systems, cleans all the buffers, counters, etc., and reads the calibration and system parameters from the non-volatile memory 20. These calibration and system parameters are obtained during a short Study Procedure after installation of the system, in which the transceivers are operated, and the echo data accumulated for about 30 seconds while the door is forced to close and open upon itself. This data is stored and is used as the "data base" for comparison with the operational data obtained during the normal operation of the system.

During the normal operation of the system, the data received from the eight sensor heads $SH_1$–$SH_8$ via their control units 12, 14, is read, and is compared with the previously-recorded data obtained during the Study Procedure. The latter data serves as threshold values in order to filter out the object-derived echo signals from the environmental noise signals produced by the door, wall, floor, etc. Preferably, dynamic thresholding is used in which the threshold values are dynamically recalibrated every Nth (e.g., 10th) run.

The main control unit 16 then performs a second filtering operation by averaging a predetermined number of signals (e.g., 10), with respect to the approach sensors Sa and the protect sensors Sp, in order to further reduce the noise (since noise tends to be random), and also to increase the signal strength.

The so-filtered data is then used to control the sliding door panels $SDP_1$, $SDP_2$ as follows:

The protect sensors Sp are used for sensing the presence of an object in either of the opening-door protect areas ODPL, ODPR when a closed door is to be opened, or in the closing-door protect areas CBD1, CBD2 when an open door is to be closed. The sensors on one side of the door are used for transmission, and those on the other side for reception. If the first detection is the floor distance, this means that there is no obstacle in the respective area, and therefore the door may be closed or opened, according to the command. On the other hand, if an echo is detected at a shorter distance than the floor distance, this indicates there is an object in the protected area, and the door will be controlled accordingly.

For each object detected by the approach sensors $Sa_1$–$Sa_8$ in the eight sensor heads $SH_1$–$SH_8$, all the cells for a detected object are identified. Thus, a large physical object will be detected in a large number of contiguous (bordering) cells in the approach area $A_1$, $A_2$ as illustrated in FIGS. 1 and 2, whereas a small object will be detected in only a single cell, or a relatively few cells.

The main control unit then determines the center of gravity of all the cells in which an object is detected and continuously monitors the movement of that center of gravity to determine whether it moves within a predetermined distance from and towards the doors, or at a predetermined velocity towards the doors, while the doors are closed. The approach area is monitored by the approach sensors Sa, and the center-of-gravity of the cells of the detected objects is used for controlling the opening of the doors. The doors are automatically closed a predetermined time interval after opening, unless an object is detected in the closing-door protect regions CPD1, CPD2.

Further details of the construction and general operation of the apparatus illustrated in FIGS. 1–6 are set forth in my above-cited patent application Ser. No. 09/245,742.

The invention of the present application relates primarily to the closing-door operation of the system, in order to prevent closing of an open door in the event an object is detected within the closing door protective area CPD1, CPD2 in FIG. 1.

Closing Door Operation

During a closing operation, only the two sensor heads $SH_2$, $SH_3$ on one side of the door frame, and the two corresponding sensor heads $SH_6$, $SH_7$ on the other side of the door frame, are involved since these sensor heads monitor the closing-door protect areas CDP1, CDP2, between the inner ends of the sliding door panels. As described above, each sensor head is in the form of a transceiver which includes a transmitter for transmitting ultrasonic energy downwardly towards the floor at one side of the door frame, for reflection upwardly at the other side of the door frame, and, at the other side of the door frame, a receiver which receives the energy reflected upwardly from the floor. These transmitters and receivers are sequentially actuated such that the receiver of one transceiver will receive only the energy transmitted by its transmitter.

Figure 7:
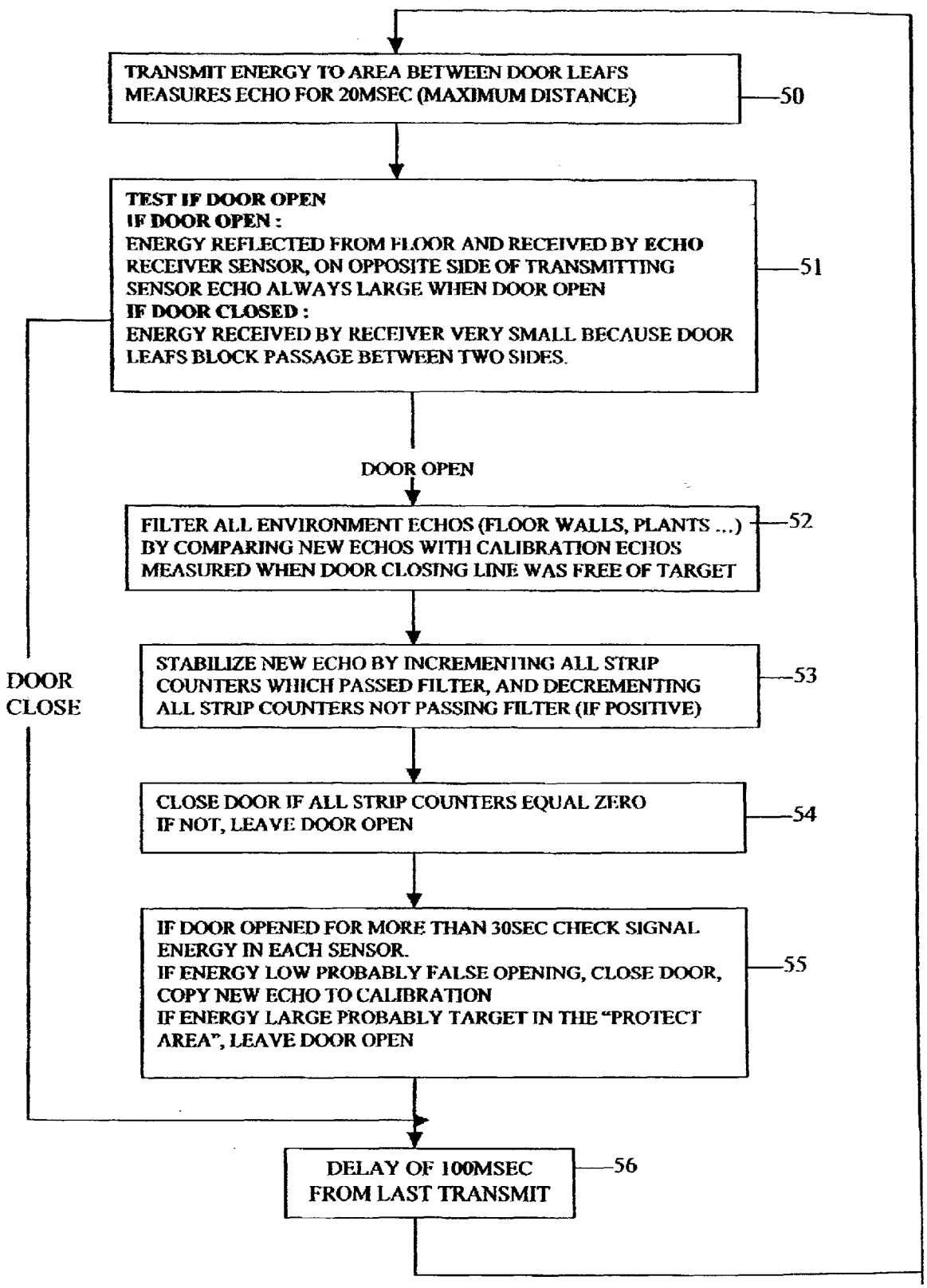
FIG. 7 is a flow chart illustrating the closing-door operation of the described system.

Thus, as shown by block 50 in FIG. 7, the transmitter of a protect sensor Sp at one side of the door transmits energy towards the floor. This energy is received by the receiver in the protect sensor Sp at the other side of the door for a period of 20 msec, which represents the maximum distance to the floor (300 cm). This received energy is fed to the control system, as illustrated in FIG. 6, which control system utilizes the level of the reflected energy received by the receiver to determine the position of the door. Thus if the door is fully closed, very little if any ultrasonic energy will be received by the reflector at the opposite side of the door; and if the door is fully opened, a high level of energy will be received by the receiver at the opposite side of the door. The intensity of the received energy will also indicate any intermediate position of the door, since such intensity will decrease as the door moves from its initial fully-open condition to its final closed position (block 51).

When the door is closed, the opening of the door is controlled by monitoring the approach area via the approach sensor Sa, as described in the above-cited patent application.

When the door is open, the received echoes are filtered with respect to environmental, non-changing conditions, such as floor walls, plants, etc., by applying a dynamic threshold to the received energy. This is done by comparing new echoes with calibration echoes that were produced in the initial Study Mode, as described above, and as indicated by block 52 in FIG. 7.

The so-filtered echo energy is then subjected to an analysis, by the main control unit 16, to determine whether the received reflections indicate that an object (target) is present within the closing door protect area CPD1, CPD2 (FIG. 1).

Thus, the vertical space of the door passageway is also divided into a plurality of vertical strips, one for each head $SH_1$–$SH_8$, with each vertical strip divided into a plurality of horizontal cells to define a rectangular matrix of cells arranged in a plurality of vertical columns and horizontal rows, similar to the way the horizontal approach area is divided into a matrix of cells as illustrated in FIG. 2 and as described above. A counter in the main control unit 16 is allocated to each vertical strip. The counter is incremented when an echo is received, and decremented when no echo is received, from its respective strip such as to reach "0" if no echo is received for the height of the door passageway.

Thus, as indicated by block 53, FIG. 7, the control system detects an object by utilizing the received reflected energy (echoes) exceeding the dynamic threshold to increment the counters within the control system, and to decrement such counters in the absence of receiving such energy. Thus, when all the counters have been zeroized, this indicates no object is present in the passageway, and a command is therefore produced to close the door (block 54).

If the door remains open for more than 30 seconds, a check is made with respect to the sum (sigma) of the energy in each protect sensor Sp, as indicated by block 55. If the energy is low, this indicates a false opening, and therefore the close-door command is given and new information is submitted for calibration to update the dynamic threshold. On the other hand, if the energy is large, this indicates there is an object (target) in the area to be protected, and therefore no close-door command is issued, but rather the door remains open.

The foregoing operation repeats every 100 msec (block 56).

The intensity of the energy received by the receivers in the protect sensor Sp, and the time of receipt of such energy relative to the time it was transmitted by the corresponding transmitter, is used for determining the open-condition of the door, the size and location of an object within the protect area, and the direction of movement of such an object, i.e., whether moving towards or away from the door or parallel to the door.

The intensity of the reflected energy (echoes) received by the receivers after an elapsed time interval indicating the energy was reflected from the floor, is also used for determining the instantaneous position of the door, and for controlling the system sensitivity in response to such door position. Thus, maximum energy is received when the door is fully open; minimum energy is received when the door is fully closed; and an intensity between maximum and minimum will be received corresponding to the intermediate position of the door. The instantaneous position of the door is used for controlling the sensitivity of the detection process in the manner illustrated by the flow chart in FIG. 8. The sensitivity may be appropriately changed by dynamically changing the filter threshold.

Figure 8:
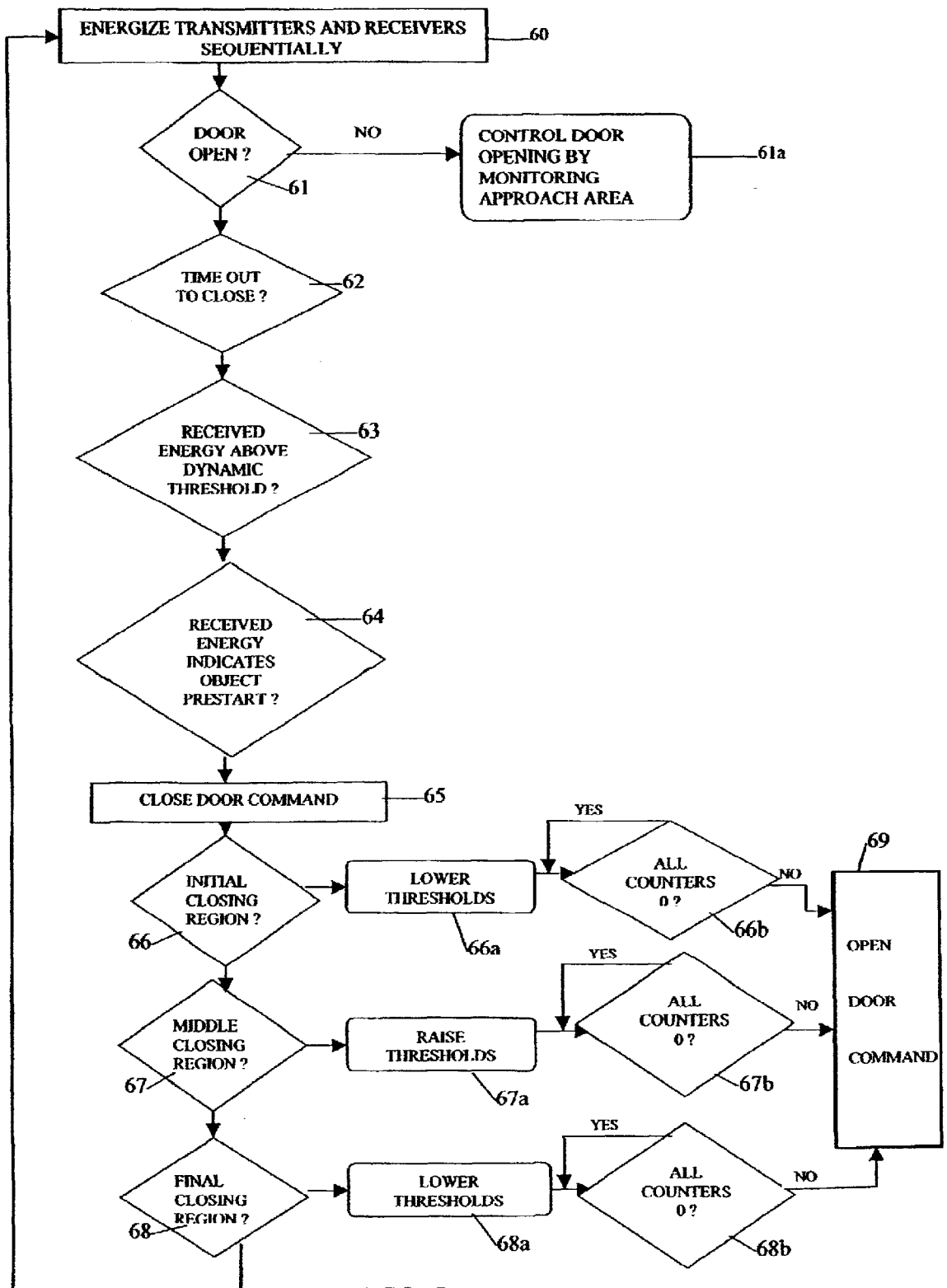
FIG. 8 is a flow chart more particularly illustrating the closing operation.

Thus, as shown in FIG. 8, the transmitters and receivers are enegized sequentially (block 60), and when the door is determined to be closed, the control system controls the door opening by monitoring the approach area as described particularly in application Ser. No. 09/245,742 (blocks 61, 61*a*). As soon as the door is opened, it remains open for a predetermined time and automatically closes at the end of that time period (block 62) unless an object is detected in the closing-door protect areas CDP1, CDP2 in the manner described above with respect to FIG. 7 (blocks 63, 64). If no such object is detected, the control system generates a close door command (block 65), whereupon the sliding doors begin to close towards each other. However, during the closing movements of the door, the control system continues to sense the possible presence of an object within the close door protect areas CDP1, CDP2, but changes the sensitivity of the detection process according to the instantaneous position of the doors, as shown by blocks 66, 67 and 68 in FIG. 8.

Thus, when the doors are in the initial closing region (i.e., just starting to close), the dynamic thresholds are lowered to increase the sensitivity of the system (blocks 66, 66*a*); when the doors are in the middle closing region, the dynamic thresholds are raised to decrease the sensitivity of the system (blocks 67, 67*a*); and when the doors are in the final closing region, the thresholds are lowered to again increase the sensitivity of the system (blocks 68, 68*a*). As described earlier, the door will continue to close only when all counters are zero, so that if any object is detected during this closing operation according to the threshold level determined by the instantaneous position of the doors, the close door command will be interrupted, and instead an open door command will be generated to reopen the doors (block 66*b*, 67*b*, 68*b* and 69).

While the invention has been described with respect to a sliding door system, which represents one preferred embodiment, it will be appreciated that this is set forth merely for purposes of example, and that the invention could be incorporated also in swinging door systems, and that many other variations, modifications and applications of the invention may be made.

What is claimed is:

1. A method of automatically controlling the movement of a door over a floor from an open position to a closed position with respect to a door frame, comprising:

mounting at least one ultrasonic transmitter over the door frame at one side thereof and oriented to transmit ultrasonic energy downwardly towards the floor and to reflect said energy from the floor upwardly at the opposite side of the door frame;

mounting at least one ultrasonic receiver over the door frame at said opposite side thereof and oriented to receive the energy from said ultrasonic transmitter reflected by the floor;

and processing the reflected energy received by said ultrasonic receiver to detect the presence of an object in the path of the door, when moving toward its closed position, and to automatically interrupt the closing of the door in response to such detection.

2. The method according to claim 1, wherein the intensity of the energy received by the ultrasonic receiver, and the time of receipt thereof relative to the time such energy was transmitted by the ultrasonic transmitter, are utilized for detecting the location of an object with respect to the path of the closing door.

3. The method according to claim 1, wherein the intensity of the energy received by the ultrasonic receiver is also used for determining the position of the door with respect to the door frame.

4. The method according to claim 3, wherein said determined door position is used to control the closing of the door by applying a high sensitivity to the detection of an object in the path of the closing door during the initial closing movement of the door.

5. The method according to claim 4, wherein said determined door position is used to control the closing of the door by applying a low sensitivity to the detection of an object in the path of the closing door during the intermediate closing movement of the door.

6. The method according to claim 5, wherein said determined door position is used to control the closing of the door by applying a high sensitivity to the detection of an object in the path of the closing door during the final closing movement of the door.

7. The method according to claim 1, wherein:

the door passageway is divided into a rectangular matrix of cells arranged in a plurality of vertical columns and horizontal rows;

a transmitter, receiver and counter are allocated for each vertical column;

each counter is decremented towards zero when its respective receiver receives no energy above a threshold from its respective transmitter;

and a close-door command is executed when all said counters are decremented to zero.

8. The method according to claim 7, wherein said threshold is changed according to the instantaneous position of the door during its closing movements so as to have a relatively low threshold at the final closing movement of the door.

9. The method according to claim 7, wherein at least two ultrasonic transmitters are mounted in spaced relationship to each other over said passageway at said one side of the door frame, and at least two ultrasonic receivers are mounted in spaced relationship to each other over said passageway at said opposite side of the door frame, to thereby divide said passageway into at least two vertical columns of cells at each side of said door frame.

10. The method according to claim 1, wherein said moving door is a sliding door.

11. Apparatus for automatically controlling the movement of a door over a floor from an open position to a closed position with respect to a door frame, comprising:

at least one ultrasonic transmitter mounted over the door frame at one side thereof and oriented to transmit ultrasonic energy downwardly towards the floor at one side of the door frame and to reflect said energy from the floor upwardly at the other side of the door frame;

at least one ultrasonic receiver mounted over the door frame at the opposite side thereof and oriented to receive the energy from said ultrasonic transmitter reflected by the floor;

and a control system for utilizing the reflected energy received by said ultrasonic receiver to detect the presence of an object in the path of the door, when moving toward its closed position, and to automatically interrupt the closing of the door in response to such detection.

12. The apparatus according to claim 11, wherein said control system utilizes the intensity of the reflected energy received by the ultrasonic receiver, and the time of receipt thereof relative to the time such energy was transmitted by the ultrasonic transmitter, for detecting the location of an object with respect to the path of the closing door.

13. The apparatus according to claim 11, wherein said control system also utilizes the intensity of the energy received by the ultrasonic receiver for determining the position of the door with respect to the door frame.

14. The apparatus according to claim 13, wherein said control system applies a high sensitivity to the detection of an object in the path of the closing door during the initial closing movement of the door.

15. The apparatus according to claim 14, wherein said control system applies a low sensitivity to the detection of an object in the path of the closing door during the intermediate closing movement of the door.

16. The apparatus according to claim 15, wherein said control system applies a high sensitivity to the detection of an object in the path of the closing door during the final closing movement of the door.

17. The apparatus according to claim 11, wherein:

the door passageway is divided into a rectangular matrix of cells arranged in a plurality of vertical columns and horizontal rows, there being a transmitter and receiver for each vertical column;

said control system includes a counter for each vertical column;

and said control system decrements towards zero each counter when its respective receiver receives no energy above a threshold from its respective transmitter, and executes a close-door command when all said counters are decremented to zero.

18. The apparatus according to claim 17, wherein said control system changes said threshold in accordance with the instantaneous position of the door during its closing movements so as to produce a relatively low threshold at the final closing movement of the door.

19. The apparatus according to claim 17, wherein there are at least two ultrasonic transmitters mounted in spaced relationship to each other over said passageway at said one side of the door frame, and at least two ultrasonic receivers mounted in spaced relationship to each other at said opposite side of the door frame, to thereby divide said passageway into at least two vertical columns of cells at each side of said door frame.

20. The apparatus according to claim 11, wherein said moving door is a sliding door.

* * * * *